April 24, 1928.                                                                    1,667,578
R. WYLLIE
COW TAIL HOLDER
Filed Jan. 27, 1927
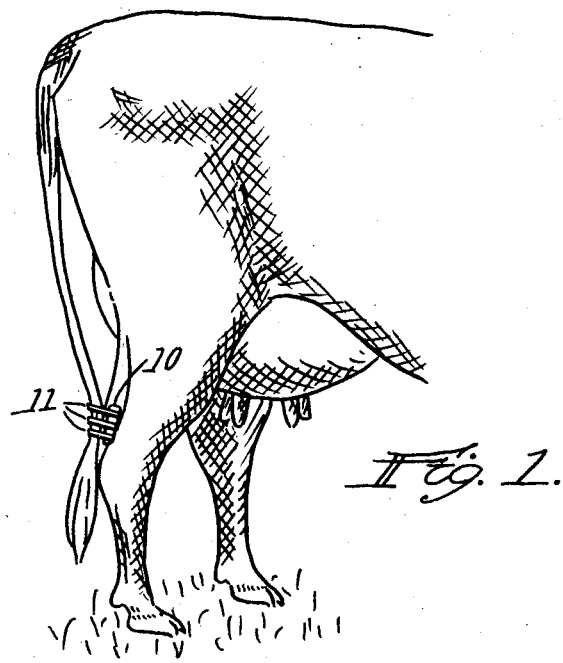
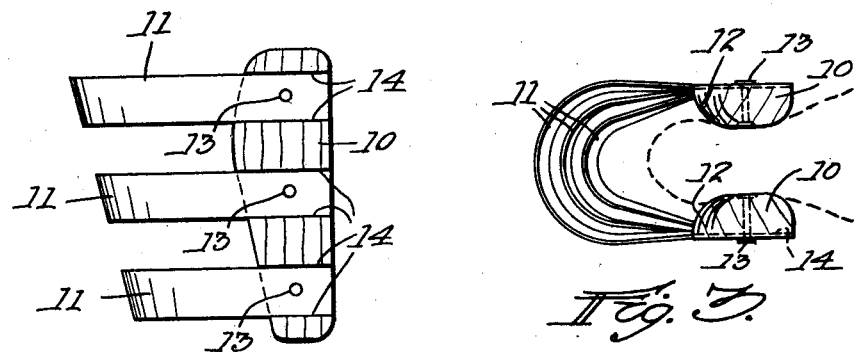

Patented Apr. 24, 1928.

1,667,578

UNITED STATES PATENT OFFICE.

ROBERT WYLLIE, OF SOUTH FRANKLIN, MASSACHUSETTS.

COW-TAIL HOLDER.

Application filed January 27, 1927. Serial No. 164,078.

This invention relates to a holder for the tails of cows for preventing accidents from the switching of their tails while they are being milked. This represents the principal object of the invention but more in detail it comprises a device which presents no sharp edges that will injure or hurt the cow and instead is provided with comparatively comfortable means for gripping the leg of the cow and for engaging and holding the tail.

Other objects and advantages of the invention will appear hereinafter.

Reference is to be had to the accompanying drawings in which

Fig. 1 is a side view showing the use of a preferred embodiment of this invention in position on the cow;

Fig. 2 is a side view of the implement; and

Fig. 3 is a plan of the same.

It is well known that the switching of a cow's tail during hand milking has caused accidents to the milker, some of them serious, and that the result is very often the abuse of the cow by an infuriated man and another result is the use of devices for holding the tail which are cruel instruments of torture. This invention is desired to effectively prevent the aforesaid accidents and thus eliminate the first-mentioned source of cruelty to the animal and also to provide a device which can be used effectively for the desired purpose without inflicting any pain on the animal.

Referring to the drawings I have shown the device in a simple form in which it comprises two wooden uprights 10 and a plurality of metallic bow springs or curved bars 11. The uprights are provided with rounded surfaces 12 on their inner sides and are tapered from top to bottom as indicated to fit in the hollows in the cow's leg. The uprights are secured to the springs 11 by rivets 13 and are provided with grooves 14 for receiving the ends of these springs so that the outer surfaces of the uprights may be made flat and in a single plane in each case. The uprights are rounded off wherever possible to avoid sharp corners of all kinds.

The springs 11 are in a series of gradually increasing length from the bottom to the top and they are spaced apart and formd of sheet or spring metal stock. They constitute a tapering cage for the tail.

In the use of the device, it is first put over a cow's tail and then brought down toward the leg and moved downwardly along the hock where it holds itself in position over the gambrel joint as shown in Fig. 1. This is possible because of the fact that the two uprights project inwardly from the springs and are spaced apart just enough so that in putting the implement in position the springs 11 are swung outwardly a little and the uprights are held on the cow's leg by spring pressure, as indicated especially in Fig. 3. This prevents displacement backwardly, upwardly and downwardly and the tail of the cow is held in a metal cage so to speak, which tapers toward the bottom so that the tail cannot be freed readily. This cage also engages the tail at a plurality of points.

This constitutes a very efficient and simple device for the purpose intended, inflicts no pain on the animal, and secures the other objects above mentioned.

Although I have illustrated and described only a single form of the invention, I am aware of the fact that modifications can be made therein by any person skilled in the art without departing from the scope of the invention as expressed in the claim. Therefore, I do not wish to be limited to the details of construction otherwise than as set forth in the claim, but What I do claim is:—

As an article of manufacture, a cow tail holder comprising a pair of opposite uprights having grooves in their outer surfaces, and a plurality of springs spaced apart and having their ends located in said grooves and riveted to the uprights at those points, and constituting a cage for holding the tail of the animal.

In testimony whereof I have hereunto affixed my signature.

ROBERT WYLLIE.